United States Patent [19]

Irvine, III

[11] Patent Number: 5,383,703
[45] Date of Patent: Jan. 24, 1995

[54] MODULAR TRAILER

[76] Inventor: S. J. Irvine, III, 181 Fairway La., Butler, Pa. 16001

[21] Appl. No.: 10,208

[22] Filed: Jan. 28, 1993

[51] Int. Cl.[6] .............................................. B60P 3/07
[52] U.S. Cl. .................................... 296/181; 296/24.1
[58] Field of Search ...................... 296/181, 168, 24.1, 296/26

[56] References Cited

U.S. PATENT DOCUMENTS

| | | | |
|---|---|---|---|
| 3,667,799 | 4/1971 | Shryock . | |
| 3,705,743 | 12/1972 | Toomey . | |
| 3,712,662 | 1/1973 | Busby . | |
| 3,845,980 | 11/1974 | Grabast . | |
| 4,127,300 | 11/1978 | Melley et al. | 296/182 |
| 4,133,572 | 1/1979 | Robbins et al. | 296/168 |
| 4,149,748 | 4/1979 | Tanner | 296/168 |
| 4,355,834 | 10/1982 | Alford | 296/168 X |
| 4,556,247 | 12/1985 | Mahaffey | 296/181 X |
| 4,556,248 | 12/1985 | Kobayashi | 296/181 X |
| 4,637,647 | 1/1987 | Bunting et al. . | |
| 4,753,450 | 6/1988 | Wibben | 296/182 X |
| 4,854,631 | 8/1989 | Laursen . | |
| 4,957,323 | 9/1990 | Johnson | 296/181 |
| 4,981,318 | 1/1991 | Doane et al. | 296/181 X |
| 5,028,087 | 7/1991 | Ells | 296/24.1 |
| 5,181,760 | 1/1993 | Muno | 296/181 |

Primary Examiner—Joseph Pape
Attorney, Agent, or Firm—Dickie, McCamey & Chilcate; Barry I. Friedman

[57] ABSTRACT

A modular trailer utilizes a small trailer body capable of being pulled by the average passenger automobile. The trailer's interior is provided such that it may be utilized in a completely open fashion for the transportation of large, bulky items, or alternatively may be utilized with the addition of removal modular walls, shelves and restraints in a wide variety of configurations which provide particularized storage spaces for small items or items requiring special restraint during transportation. The trailer is provided such that the entire interior space may be utilized as a single compartment or it may be broken down into large compartments, small compartments or a combination of the two, according to the changing and varied needs of the operator. The device utilizes a plurality of movable walls and shelves which may be interlocked in a variety of configurations as well as providing a shaded interior space. The trailer is provided with fold-out accessories such as a picnic table and trailering ramps, all of which may be broken down and stored within the trailer with a relatively small loss of utility space in the event that the device is to be utilized in an empty mode.

31 Claims, 4 Drawing Sheets

MODULAR TRAILER

BACKGROUND OF THE INVENTION

1. Field of the Invention

The present invention relates to a trailer which is towed behind an automobile, truck or the like. More particularly, this invention relates to a trailer which has a modular interior such that a variety of components may be interchangeably mounted to accommodate a variety of accessories and to provide storage for a number of particular items.

2. Description of the Prior Art

A wide variety of general purpose and particularly designed trailers have been utilized for the storage and transportation of various objects. In general, it is usually necessary to trade-off flexibility of use in such a trailer if one is intending to store and transport particularly-shaped objects. Conversely, if one needs flexibility in the particular uses to which a trailer will be applied, then the most common design for such a trailer is a large empty box. This is the most common configuration for utility trailers and provides a universal application.

In the event, however, that one requires a trailer for the transportation of small or breakable objects, or objects that do not transport well without restraint, then an empty trailer must be packed with care and generally filled to prevent loss of load during the transportation operation. Even a relatively small amount of shifting may result in damage or destruction of the trailer itself during transportation. As a final note, a particularized danger encountered during the shifting of a load during a trailering operation is the loss of stability of the moving trailer and possible damage to other vehicles on a highway or the like.

It is therefore necessary in the selection of a trailer for the transportation of objects that the trailer be well adapted to the transportation of the particular objects intended to be moved. In the event that a large number of small items are to be transported, a trailer having a large number of compartments would be the most satisfactory. This permits easy ingress and egress from the trailer as well as simple location of the objects contained therein. In the previous example, that is of the large empty trailer, it is frequently impossible to retrieve a large percentage of the stored or transported objects without removal of the entire load. This lack of flexibility also causes a lack of utility when the transported objects must be repetitively moved on to and off of the trailer.

In the situation involving a trailer having a large number of particularized compartments, or any particularized compartments for that matter, flexibility is lessened and the storage capacity of the trailer is limited to the particularly sized compartments. Should the needs of the operator change from time to time, the trailer may become completely useless depending upon the nature of the goods intended to be transported.

A number of trailers have been proposed in the prior art which provide varying levels of flexibility in order to achieve a balance between particularized storage and universal flexibility. Examples of these are Bunting et al., U.S. Pat. No. 4,637,647, issued Jan. 20, 1987, for a trailer having particularized compartments for the storage and transportation of field decoys. This device, however, utilizes a number of particularly sized and shaped compartments having particularized mounting means for the restraint of field decoys. While this is particularly useful for the transport of field decoys and other small articles, the flexibility of the device is severely limited.

Laursen, U.S. Pat. No. 4,854,631, issued Aug. 8, 1989, discloses the use of particularized compartments within a general purpose trailer for the storage of particular devices such as small motorized recreational vehicles. This device combines the features of particularized stored spaces with a general purpose vehicle, but lacks the ability to change its features when the needs of the operator have changed.

Toomey, U.S. Pat. No. 3,705,743, issued Dec. 12, 1972, is a further illustration of this situation, in which a trailer is provided with a number of particularly sized and shaped interior compartments for the storage and restraint of particular items.

Grabast, U.S. Pat. No. 3,845,980, issued Nov. 5, 1974, provides an increased amount of flexibility, having a large open interior space for the storage of large items and also having a number of small, foldable accessories and a number of smaller storage compartments along the periphery thereof.

Each of these devices has attempted to provide a particularized storage space for specific items or attempted to combine such particularized storage with additional open space for the transportation of larger items or to provide flexibility in storage capacity.

What is lacking in the art, however, is a device which provides flexible storage space which may be utilized for specialized or smaller items and alternatively may utilize the same interior space for the storage of larger items within a compact trailer capable of being pulled by a passenger automobile.

SUMMARY OF THE INVENTION

A trailer is provided which utilizes a small trailer body which is capable of being pulled by the average passenger automobile. The trailer's interior is provided with a modular design such that it may be utilized in a completely open fashion for the transportation of large, bulky items, such as a small tractor, or alternatively may be utilized with the addition of removable modular walls, shelves and restraints in a wide variety of configurations which provide particularized storage spaces for small items or items requiring special restraint during transportation. The trailer is provided such that the entire interior space may be utilized as a single compartment or it may be broken down into large compartments, small compartments or a combination of the two, according to the changing and varied needs of the operator. The device is further particularly adapted for use, in addition to the transportation of large items, as a vacation-type trailer for the storage of clothing and recreational accessories as well as being adapted for use as a recreational vehicle in and of itself.

The device utilizes a plurality of movable walls and shelves which may be interlocked in a variety of configurations as well as providing a shaded interior space for use at picnics, ball games, and the like. The trailer is provided with fold-out accessories such as a picnic table and trailering ramps, all of which may be broken down and stored within the trailer with a relatively small loss of utility space in the event that the device is to be utilized in an empty mode.

These and other particular advantages and features of this device will be more fully described and understood with reference to the presently preferred embodiments and to the appended drawings.

DESCRIPTION OF THE PREFERRED EMBODIMENTS

Figure 1:
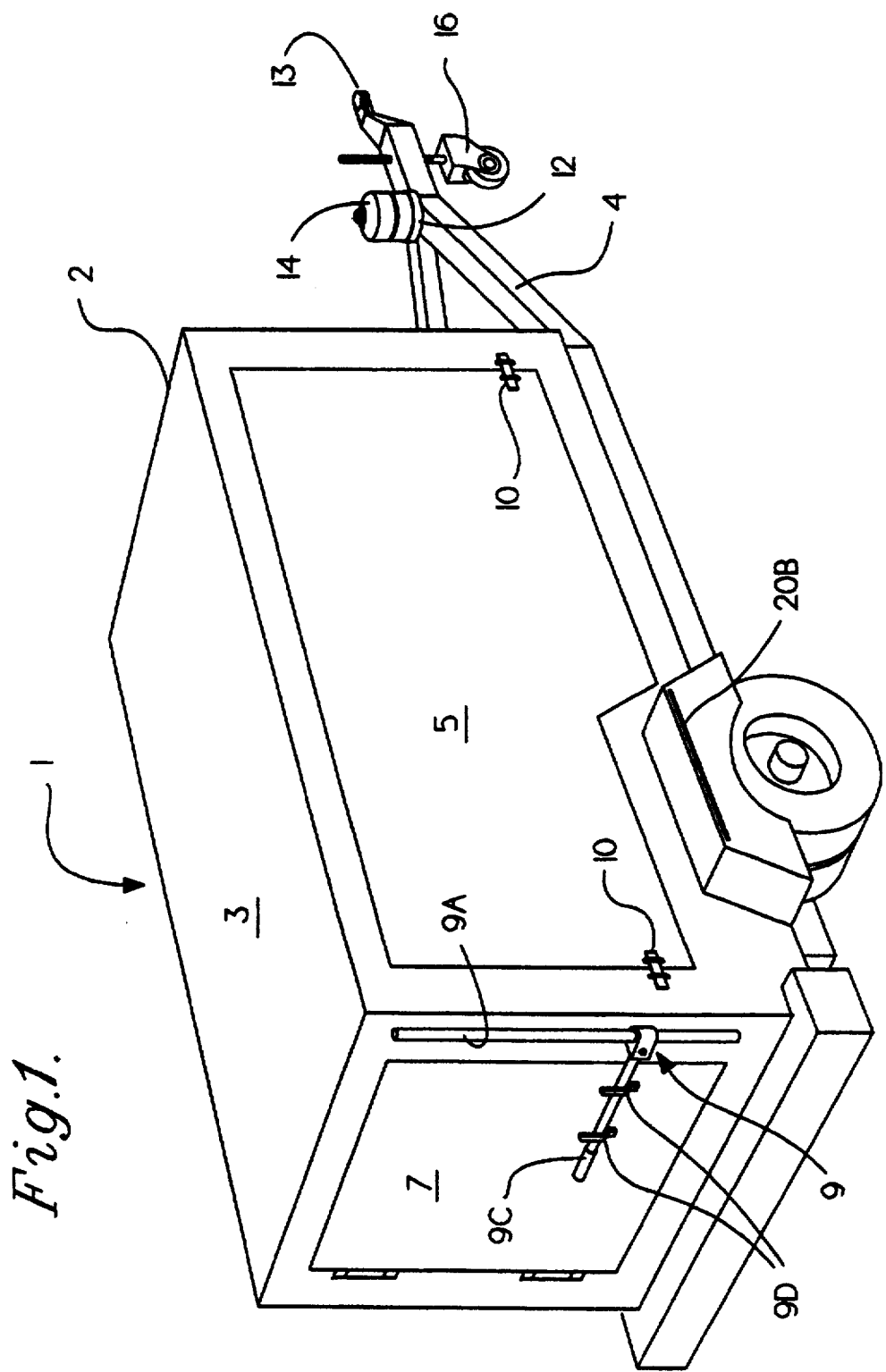
FIG. 1 is an isometric view of the exterior of the trailer in a closed configuration.

The modular trailer 1 is provided with a front panel 2 and a top panel 3 as illustrated in FIG. 1. These are unmovable blank panels which provide structural integrity for the trailer as a whole. The exterior of the trailer is, in the closed position, generally of a rectangular box. The trailer 1, as a whole, is generally sized and configured as a conventional trailer having a frame or chassis 4 upon which the storage compartment is mounted. The trailer 1 is generally provided with wheels and suspension means as is well-known in the art. The storage portion of the trailer is further provided with a hinged side door 5 and a hinged rear door 7. The particular orientation and use of these doors will be further described with reference to FIG. 2. Hinged side door 5 is provided with at least one and preferably two side door locking means 10 which may be of any conventional locking type. Examples of such include sliding and hinged bolts as well as conventional lock hasps which are adapted for use in conjunction with a padlock. Hinged rear door 7 may also be provided with any type of conventional locking means but is preferably provided with a rotational bar locking means 9 which is of a type usually associated with tractor trailers and the like. A rotational bar 9A is provided which is rotationally mounted to the rear panel of the trailer 1 adjacent to hinged door 7. The rotational bar 9A has a lock hinge 9B affixed thereto and hinged bar 9C is pivotally mounted thereto. Hinged bar 9C may be received and restrained by hinged bar restraints 9D which are firmly affixed to the exterior surface of hinged door 7. In the locked mode, hinged bar 9C is utilized to rotate rotational bar 9A such that hinged bar 9C may be inserted between hinged bar restraints 9D and hinged door 7. An additional bar locking means such as a hasp may be provided to receive a padlock which will allow the rear door locking means 9 to be restrained in the locked position. The open position of rear door locking means 9 is further illustrated in FIG. 2.

Referring again to FIG. 1, the front portion of the frame 4 is provided with a trailer hitch 13 which is conventionally sized and shaped to be affixed to a variety of trailering devices which may be affixed to a car, light truck or the like. One particular advantage of the modular trailer described herein is its relatively light weight and small size such that an ordinary passenger car may pull it without undue wear or damage to the automobile. An adjustable support wheel 16 may optionally be utilized in conjunction with the front portion of the frame to support the trailer when it is not hitched to a vehicle. The adjustable wheel is of a conventional design and may be raised and lowered relative to frame 4 by any one of a number of conventional means which are not illustrated. Frame 4 also provides a location for a propane tank support 12 which is illustrated having propane tank 14 contained therein. The location of the propane tank exterior to the storage compartment of the trailer 1 is adapted to provide maximum flexibility for storage and utilization of the propane tank in conjunction with a grill or other exterior device which will be described later in this specification.

Figure 2:
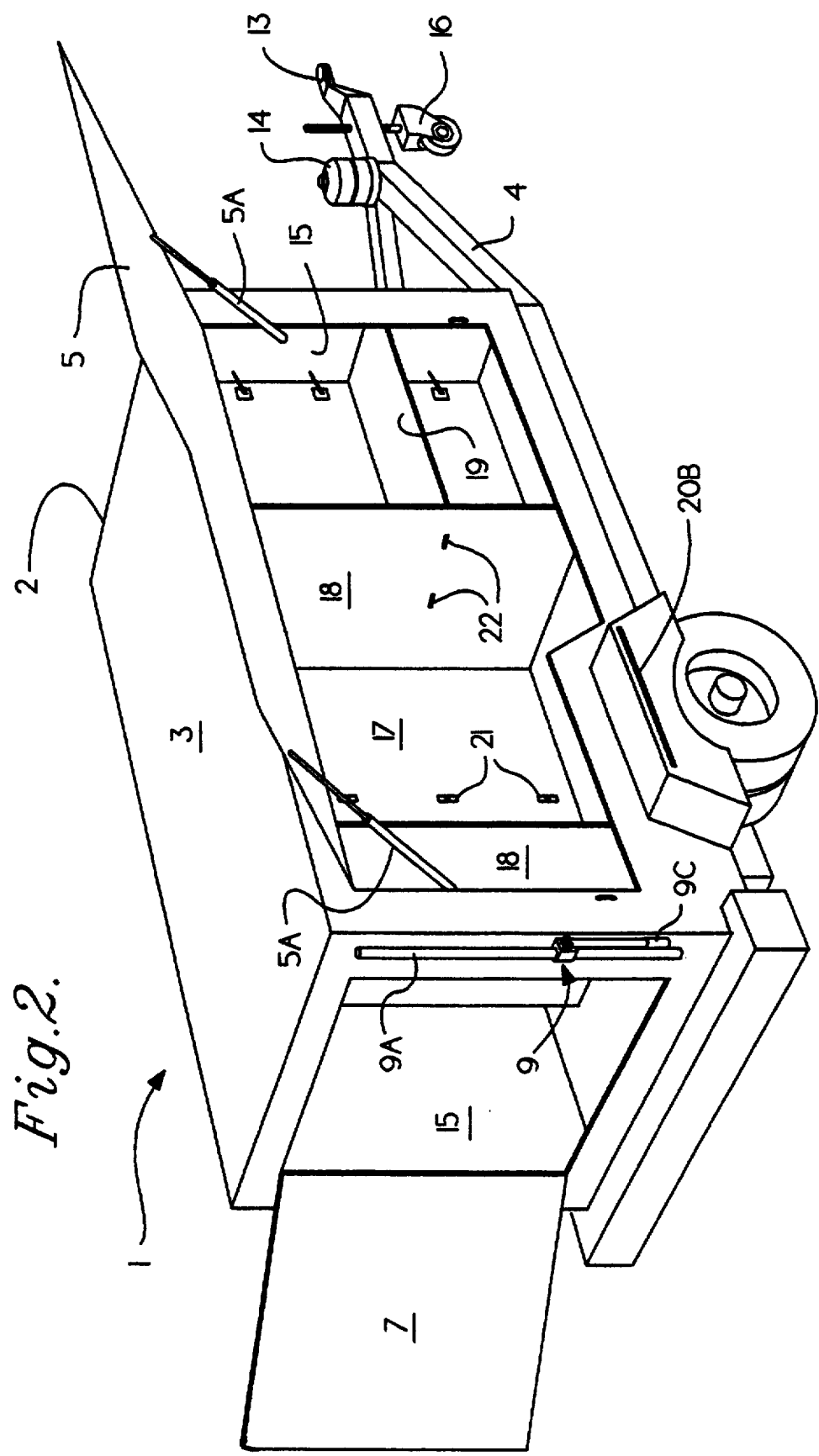
FIG. 2 is an isometric view of the exterior of the trailer in an open configuration.

Referring now to FIG. 2, the trailer is shown having hinged side door 5 and hinged rear door 7 in the open position exposing the interior in one of its many modular embodiments. While a number of these interior arrangements are described within this specification, it is to be specifically noted and understood that the interior modular components may be assembled in a wide variety of arrangements and that such arrangements are limited only by circumstances and not by the description herein.

Hinged side door 5 is hinged along its upper edge and may be raised and lowered in order to provide access to the interior space from the side position. The hinged side door 5, while in the open position, also provides an awning for the area immediately adjacent to the side portion of the trailer 1. Gas pistons 5A are affixed to hinged side door 5 and side walls of the compartment in order to provide a stable support for hinged side door 5 in its open position. Gas pistons 5A are adapted such that hinged side door 5 may be stably located in any position through the entire length of the extension of gas pistons 5A. Additionally, the pistons 5A may be mounted in a plurality of positions to allow the extreme opening position of hinged side door 5 to be adjusted. It is expected, however, that hinged side door 5 will be utilized most often in its fully-extended position.

Hinged rear door 7 is hinged along one of its side edges. It is adapted to open such that when fully opened, it is parallel to the rear face of the storage compartment. A hold-down means (not shown) may be utilized to hold hinged rear door 7 in the open position during the loading and unloading of objects through the rear door. Hinged rear door locking means 9 is illustrated in the unlocked position in which hinged bar 9C is lying parallel to rotational bar 9A and is not engaged with hinged rear door 7. This arrangement removes rear door locking means 9 from the area immediately adjacent to the opening of hinged rear door 7 and therefore is not likely to interfere with objects passing through the opening of hinged rear door 7.

The interior of the storage compartment is provided with interior side walls 15. Interior side walls 15 are provided with a variety of means for the affixing of the modular walls. The operation of the attachment of these modular walls to side walls 15 will be more particularly described with reference to FIG. 3. The modular walls are further comprised of interior short modular walls 18 and interior long modular walls 17. The modular interior may be constructed with any combination of these long and short interior modular walls. Furthermore, dependant upon the particular arrangement of the walls and the needs of the operator, intermediate sizes of these walls may be provided. It is to be specifically noted that no particular size or length of these walls is required by the design of the trailer and that a variety of different sized walls may be provided and combined to provide the most flexible interior arrangement. As illustrated in FIG. 2, interior long modular wall 17 bisects the interior space of the trailer 1 along its longitudinal axis while interior short modular walls 18 are mounted perpendicular thereto to provide both stability and a plurality of smaller storage compartments. A modular interior shelf 19 is placed extending perpendicular to interior short modular wall 18, interior long modular wall 17 and interior side wall 15 to provide an even smaller storage compartment.

The modular shelves and walls are affixed to each other through a series of locks or locking means which permit the removable interconnection of the various components in a variety of ways. Interior modular wall locks 21 are illustrated as connecting interior short modular wall 18 and interior long modular wall 17. These locking means may be comprised of any well known interconnection including a tongue-and-slot sliding clamp, sliding latch or screw-type model. The preferred embodiment includes a simple sliding device which allows the components to be firmly interconnected without the use of any tools and further allows the components to be assembled or disassembled with maximum speed and ease. Interior modular shelf locks 22 may be comprised on any of the previously described devices or may be further comprised of a series of slots cut into the modular walls or merely an extended support portion upon which the shelf may be laid to be restrained by gravity and the other wall members.

It should be specifically noted that the wall and shelf portions are adapted to allow interconnection in a wide variety of arrangements such that any number of items may be stored at the same time but which are comprised of various shapes, sizes and having different transportation restraint needs. It is specifically expected that the trailer will be provided with a number of wall portions having various sizes that may be combined in any fashion. While it is most common to place the walls at fractional intervals of space, such that the interior cabin may be divided into thirds or halves in either dimension, it is specifically intended that mounting locks or other engagement means may be provided at any location according to the desires of the operator and that the interior modular units may be constructed in such a way that the walls are placed at odd lengths, angles or orientations with respect to each other.

Figure 3:
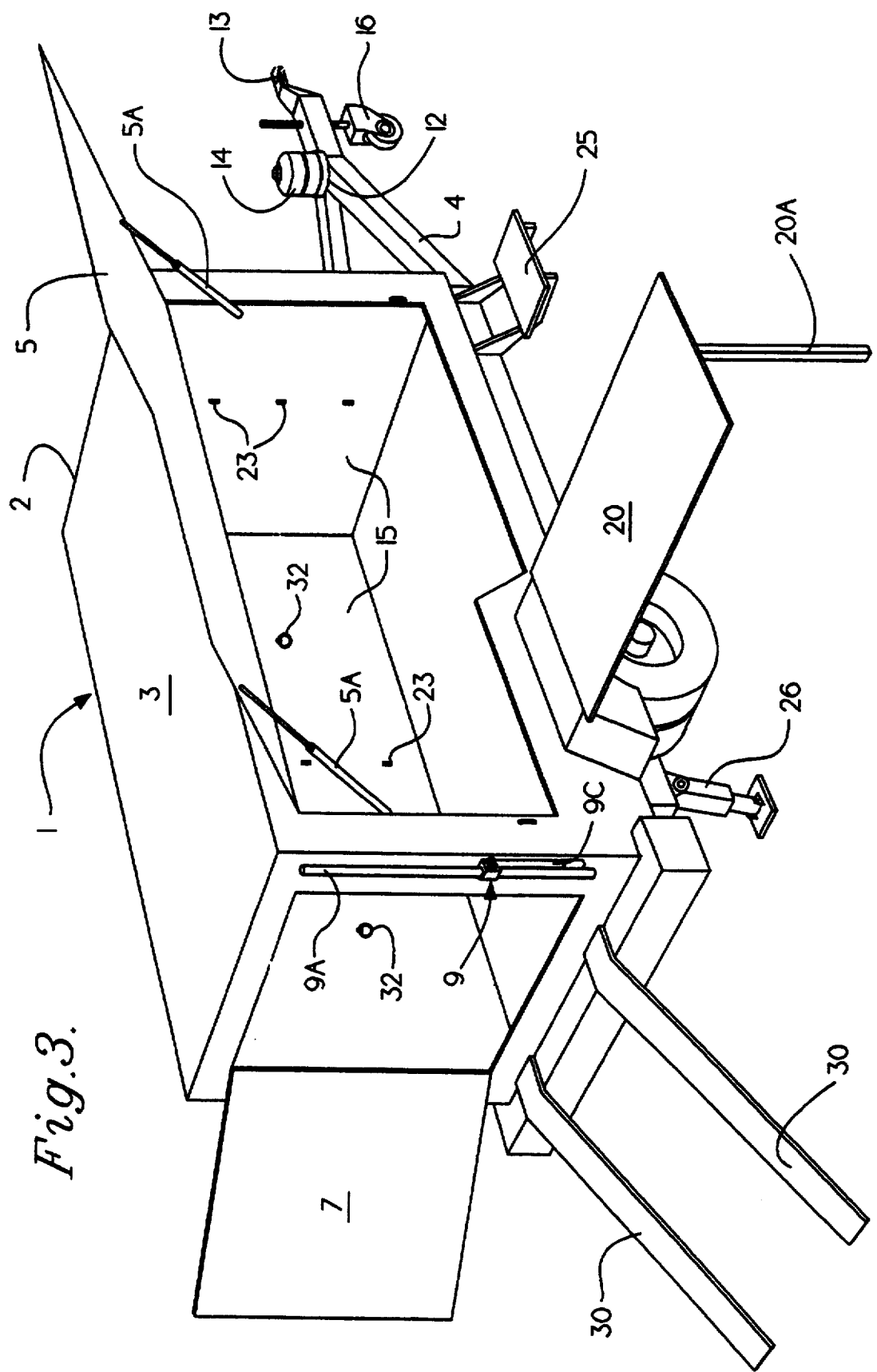
FIG. 3 is an isometric view of the exterior of the trailer in a second open configuration.

Referring now to FIG. 3, the interior compartment is shown with all walls and shelves removed therefrom. A plurality of interior side wall locking means 23 are provided along the interior walls 15 of the modular trailer 1 as well as along the inner face of top panel 3. As previously stated, these locking means may be located at any location along the expanse of the interior walls 15 or top panel 3 and are illustrated at half-way points of the two walls in FIG. 3 merely for illustrative purposes.

A variety of accessories may be provided for use with the trailer in several of its particularized uses. A picnic table 20 is provided with a pivotal picnic table leg 20A and may be temporarily affixed to any exterior point of the modular trailer 1. As shown in FIG. 3, the picnic table 20 is affixed to the fender thereof. The picnic table may be temporarily affixed to any one of a number of positioning means, the most common of which is an elongated tongue-and-slot arrangement comprising a tongue along the length of the edge of the picnic table and a slot 20B along the edge of the fender shroud. It is specifically intended that the picnic table be stored in a flat or nearly flat orientation for storage within the modular trailer without occupying an undue amount of space. It may be utilized as a shelf in conjunction with the interior side or modular walls, or it may be simply restrained in position within the trailer. The foldable picnic table leg 20A is folded at its hinged end to achieve a nearly flat orientation.

An adjustable step 25 is optionally provided along the exterior lower edge of the modular trailer 1 to facilitate ingress and egress from the trailer. The adjustable step 25 may be slidable for permanent storage under the modular trailer storage compartment or removable for permanent storage interior to the storage compartment.

An adjustable support jack 26 may optionally be provided at any one or all of the corners of the modular trailer in order to stabilize the device while it is in a stationary mode. Like the adjustable step 25, the jack may be pivotable or sliding for permanent storage exterior to the storage compartment or removable for storage within the storage compartment. The preferred embodiment includes an adjustable jack which is height adjustable such that it is adaptable to any type of terrain upon which the trailer may be parked. Adjustable support wheel 16 may also be utilized to stabilize the front portion of the trailer when it is in a stationary position.

A removable ramp or ramps 30 may also be optionally provided to permit the storage of large wheeled vehicles within the trailer compartment. The ramps 30 are generally removable and are positioned according to well known means for securing them to the rear bumper of the trailer 1. The preferred method of affixation of these ramps is a simple tongue extending outwardly from the upper edge of the ramp which engages the rear bumper in a secure fashion. The ramps are easily removable and light weight for low volume storage within the modular trailer.

A plurality of restraining rings 32 may be positioned along the interior side walls 15 at a plurality of locations. These restraining rings 32 may be utilized in conjunction with rope or elastic restraint cords for the storage and restraint of the various accessories, including the picnic table and ramps, as well as the modular interior walls when not mounted for use in the interior space. Additionally, when the accessories and/or walls are mounted for use or not contained within the storage compartment, the restraining rings may also be utilized to receive and restrain a variety of articles during transportation.

Although not illustrated specifically in FIG. 3, it should be specifically noted that a side hinged door 5 may be provided along both of the long side walls of the trailer 1. FIG. 3 illustrates an embodiment having merely one hinged side door 5.

Figure 3A:
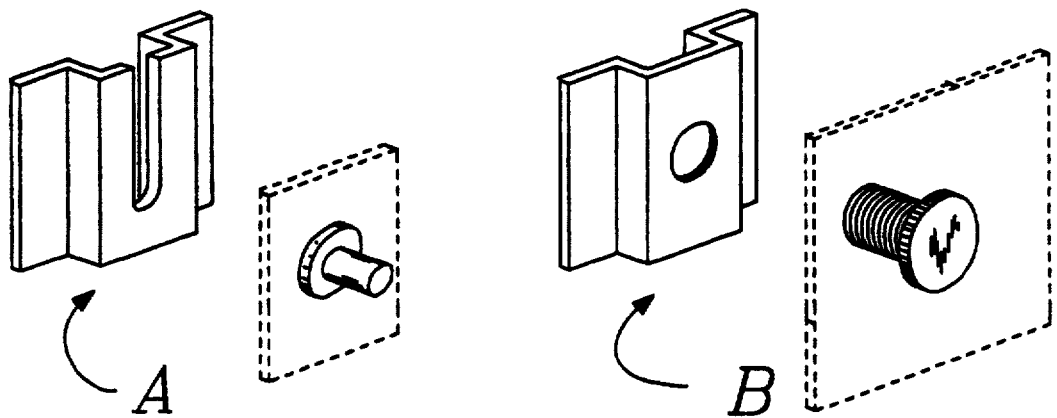
FIG. 3A is an isometric view of two alternative embodiments of locking means.

FIG. 3A illustrates several locking means which may be utilized for the selective interconnection of the interior modular walls 17, 18 and interior side walls 15, in addition to the sliding latch embodiment illustrated in FIGS. 2 and 3. Embodiment A illustrates a tounge and slot which Embodiment B illustrates a screw type latch.

Figure 4:
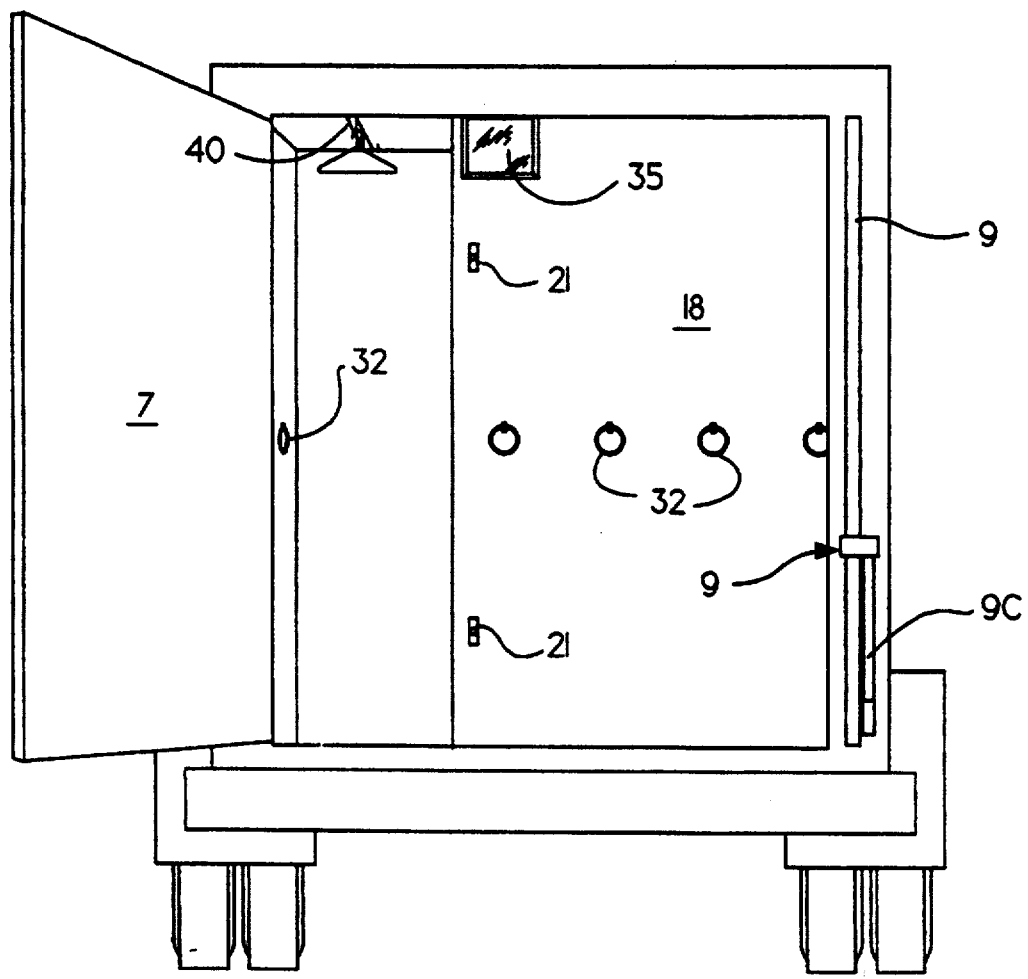
FIG. 4 is an elevational view of the interior of the trailer as seen from the rear, having the rear door removed.

Referring now to FIG. 4, the trailer is shown having an interior short modular wall 18 mounted across two-thirds of the width dimension of the interior of the trailer. A light 35 may optionally be provided within the trailer mounted either to a modular interior wall or an interior side wall 15. The light may be battery operated or be powered through conventional electrical connections provided from the towing vehicle. An adjustable roof rack 40 or plurality of roof racks 40 may be positioned at any location or at various intervals across the interior surface of the top panel 3 for the restraint and storage of a variety of items. These roof racks may be utilized to receive a restraining rope or elastic cord for the restraint of various objects during transportation or may be utilized to store clothing on hangers or the like if the trailer is to be utilized for that purpose. Also illustrated in FIG. 4 is the placement of restraining rings 32 along interior short modular wall 18. These restraining rings 32 may be positioned along any of the interior modular walls in addition to the interior side walls 15.

In operation, the modular trailer may be utilized in a variety of different modes involving various combinations of the interior parts and accessories. The simplest mode in which the trailer is operated is one in which the interior is completely empty of modular interior walls and accessories as illustrated in FIG. 3. The picnic table 20 and ramps 30 may be restrained along the interior wall 15 as previously described and essentially the entire interior portion of the trailer is open and useable for storage or transportation of a wide variety of items. The use of hinged side door 5 permits easy access to the entire interior of the trailer while rear hinged door 7 may also be utilized for this purpose.

A second mode of operation is illustrated by FIGS. 2 and 4. The walls and shelves are arranged such that a wide variety of items such as clothing and home accessories may be stored within the interior compartment, and as such the trailer may be utilized for transportation of personal objects and the like. Clothing may be stored on hangers affixed to adjustable roof rack 30 as shown in FIG. 4, while folded or boxed items may be stored along other portions of the interior or on any one of a number of modular interior shelves 19.

A third mode of operation is also illustrated by FIGS. 2 and 3. The trailer may be utilized as a semi-recreational vehicle in conjunction with the picnic table 20 mounted exteriorly to the trailer, once the trailer has been parked in a camp ground, parking lot or the like. The interior space may be utilized for the storage or preparation of food which may then be consumed along the outside of the vehicle. A gas grill or other food preparation equipment may be utilized in conjunction with the propane bottle illustrated in FIG. 1. The use of one or a plurality of interior long modular walls 17 is particularly suited for the convenient and easily accessible storage of a series of bicycles within the interior space which are preferably positioned longitudinally along the long axis of the trailer. The series of restraining rings 32 as illustrated in FIG. 4 are particularly adapted to receive and restrain a series of golf bags which may be secured through the use of rope or elastic cord therethrough.

While the present preferred embodiments of the invention have been shown and described herein, it is to be distinctly understood that the invention is not limited thereto but may be variously embodied and practiced within the scope of the following claims.

What is claimed is:

1. A modular trailer for both storage and transportation of a variety of variously sized and shaped items and for use as a recreational vehicle, the trailer comprising:
   a) a trailer chassis;
   b) a hollow body mounted thereon, said hollow body having a front, rear and two sides, forming an interior space;
   c) a rear door mounted in the rear of said hollow body for ingress and egress from said interior space;
   d) at least one side door mounted in at least one side of said hollow body, said side door allowing access to at least a portion of said interior space;
   e) fixed rigid interior walls, mounted within said interior space at the periphery thereof and to said front, rear and side walls;
   f) at least one modular rigid interior wall, adapted for selective placement within the interior space to at least partially divide said interior space into a plurality of smaller spaces; and
   g) mounting means, affixed to one of said at least one modular interior wall and said fixed interior walls for selective interconnection therebetween.

2. A modular trailer as described in claim 1, wherein said at least one side door has a top and bottom edge and is hinged along said top edge.

3. A modular trailer as described in claim 2, wherein said at least one side door is sized and adapted to open such that both objects and people may pass therethrough.

4. A modular trailer as described in claim 2, wherein said at least one side door is sized and adapted to open upwardly.

5. A modular trailer as described in claim 4, further comprising restraining means for restraining said at least one side door in a plurality of open positions.

6. A modular trailer as described in claim 5, wherein said restraining means is comprised of a shock absorber.

7. A modular trailer as described in claim 5, wherein said at least one side door is restrained in an extreme open position and said at least one side door is adapted to further function as an awning for an area immediately adjacent said modular trailer.

8. A modular trailer as described in claim 1, further comprising locking means for securing said at least one side door in a closed position.

9. A modular trailer as described in claim 1, wherein said at least one side door comprises essentially the entire side of said hollow body.

10. A modular trailer as described in claim 1, wherein said rear door has top, bottom and side edges and is rotatably mounted to said hollow body along one of said side edges.

11. A modular trailer as described in claim 10, further comprising locking means for securing said rear door in a closed position.

12. A modular trailer as described in claim 11, wherein said locking means is further comprised of a rotatable bar mounted upon an exterior surface of said hollow body adjacent said rear door, a pivotable bar mounted upon said rotatable bar and at least one receiving and restraining means mounted upon said rear door, whereby said pivotable bar may be selectively rotated into a position adjacent said rear door and selectively pivoted into a position within said receiving and restraining means, securing said rear door in a closed position, and whereby said locking means is generally parallel and adjacent to said hollow body in both a locked and unlocked configuration.

13. A modular trailer as described in claim 1, wherein said hollow body is mounted along one edge of said trailer chassis and covering a portion thereof, said trailer chassis further comprising a smaller triangular portion extending outwardly from said hollow body.

14. A modular trailer as described in claim 13, wherein said trailer chassis further comprises a height-adjustable support wheel mounted on said smaller triangular portion at a point opposite said hollow body.

15. A modular trailer as described in claim 13, further comprising a support means mounted on said smaller triangular portion, said support means being sized and adapted to receive and restrain a propane tank.

16. A modular trailer as described in claim 1, wherein said fixed interior walls further comprise at least a first portion of said mounting means, said first portion of said mounting means spatially arranged upon said fixed interior walls to receive and restrain said modular interior walls in a stable manner in a plurality of positions.

17. A modular trailer as described in claim 16, wherein said modular interior walls further comprise at least a second portion of said mounting means, said second portion of said mounting means sized and adapted to selectively interconnect to said first portion of said mounting means affixed to said fixed interior walls.

18. A modular trailer as described in claim 17, wherein said mounting means further comprises a sliding latch.

19. A modular trailer as described in claim 17, wherein said mounting means further comprises a tongue and slot.

20. A modular trailer as described in claim 17, wherein said mounting means further comprises a screw type latch.

21. A modular trailer as described in claim 1, wherein said fixed interior walls further comprise at least one locking ring, adapted to receive and restrain one of a hook and rope.

22. A modular trailer as described in claim 1, wherein said modular interior walls further comprise at least one locking ring, adapted to receive and restrain one of a hook and rope.

23. A modular trailer as described in claim 1, further comprising a mounting slot, mounted upon at least one of said rear and sides of said hollow body, adapted to receive and restrain a table surface.

24. A modular trailer as described in claim 23, further comprising a flat table surface which may be selectively affixed to said mounting slot, said flat table surface having at least one secondary foldable leg for support.

25. A modular trailer as described in claim 1, further comprising at least one selectively extendable support jack mounted to one of said hollow body and said trailer chassis, said at least one selectively extendable support jack adapted for support of said modular trailer when said modular trailer is in a rest mode.

26. A modular trailer as described in claim 25, wherein said modular trailer is further comprised of four lower corners and said at least one selectively extendable support jacks are mounted beneath at least one of said four lower corners.

27. A modular trailer as described in claim 1, further comprising a step located adjacent said at least one side door, said step adapted to hang intermediate said at least one side door and the ground.

28. A modular trailer as described in claim 1, further comprising at least one removable ramp for facilitating ingress and egress from said interior space, said at least one ramp selectively mountable immediately adjacent said rear door.

29. A modular trailer as described in claim 1, further comprising a light within the interior space.

30. A modular trailer as described in claim 1, wherein said interior space is further comprised of a top surface, said top surface further comprising at least one support rod, said support rod sized and adapted for receiving and restraining a variety of hanging objects.

31. A modular trailer as described in claim 30, wherein said top surface further comprises at least a first portion of said mounting means, adapted to receive and restrain said modular interior walls.

* * * * *

UNITED STATES PATENT AND TRADEMARK OFFICE
CERTIFICATE OF CORRECTION

PATENT NO. : 5,383,703

DATED : January 24, 1995

INVENTOR(S) : S. J. Irvine, III

It is certified that error appears in the above-identified patent and that said Letters Patent is hereby corrected as shown below:

<u>In the abstract</u>:

Sixth line        delete "removal" and insert -- removable --.

Column 2, line 44, after "variety of" insert -- conformations or --.

Column 6, line 56, "which" should be -- while --.

Signed and Sealed this

Sixteenth Day of May, 1995

*Attest:*

BRUCE LEHMAN

*Attesting Officer*     *Commissioner of Patents and Trademarks*